United States Patent [19]
Zeidler

[11] 3,733,080
[45] May 15, 1973

[54] SWIVEL CHUCK

[75] Inventor: Willy Zeidler, 8729 Hofheim, Germany

[73] Assignee: HEWA-HESSISCHER Werkzeug- und Apparatebau Alfred Vogler, Pfaffenwiesbach, Germany

[22] Filed: Aug. 4, 1971

[21] Appl. No.: 169,023

[30] Foreign Application Priority Data

Aug. 4, 1970 Germany..................P 20 38 574.4

[52] U.S. Cl. ...........................279/4, 279/5, 279/109
[51] Int. Cl. ....B23b 31/18, B23b 31/34, B23b 31/30
[58] Field of Search....................279/4, 5, 106, 107, 279/108, 109

[56] References Cited

FOREIGN PATENTS OR APPLICATIONS 328,776    11/1920   Germany................................279/5

Primary Examiner—Francis S. Husar
Attorney—Louis E. Marn et al.

[57] ABSTRACT

A swivel chuck in which a body is rotatable about a first axis and has two bell cranks pivoted thereto about the second axes perpendicular to the first, shorter arms of the bell cranks being acted upon by a hydraulic member movable parallel to the first axis, to pivot the bell cranks, the longer arms of which carry at their free ends jaws which are rotatable about a third axis perpendicular to the first and second axes. Links pivoted to the jaws and the body form a parallelogram linkage to maintain the orientation of the jaws. Three pistons, movable in cylinders carried by the longer arms, have shoes connected thereto which abut rollers, arranged in pairs in grooves in an actuating member connected to each jaw, the rollers of a pair being at 180° to one another, while the rollers in adjacent grooves are at 60° to one another, with respect to the third axis. Movement of a selected one of the pistons will thus rotate the actuating member and associated jaw.

10 Claims, 13 Drawing Figures

SWIVEL CHUCK

The present invention relates to a swivel chuck, such as may be used for turning machines.

One type of swivel chuck has at least two clamping jaws adapted for mutual movement perpendicularly to the axis of rotation of the chuck and at the same time rotatable by an actuating mechanism, through predetermined angles, about a pivot axis perpendicular to the axis of rotation of the chuck, pressurized pistons being actuatable perpendicularly to the pivot axis of the clamping jaws and acting on actuation surfaces.

According to the invention there is provided a swivel chuck comprising a body adapted to be rotated about a first axis, two arms each pivoted to said body about a second axis perpendicular to the first axis, each arm carrying a jaw at a location spaced from its second axis, each said jaw being rotatable with respect to its associated arm about a third axis, perpendicular to the first and second axes, a cylinder carried by each arm and having at least two pistons reciprocable therein, and an actuating member rotatable with each jaw, each actuating member having at least two sets of actuation surfaces, angularly offset with respect to one another about said third axis and positioned to be acted upon by said pistons to cause rotation of said members and thus of said jaws.

With such a construction, it is possible to index the clamping jaws through very small divisional angles. The jaws can be pivoted in both senses of rotation and the chuck can combine great precision of indexing with less exact production than is the case for known swivel chucks.

The pistons have piston rods at the free ends of which piston shoes may extend perpendicularly to the third axis and engage the actuation surfaces, to rotate the actuating member and associated jaw.

Suitably the respective actuation surfaces of the sets are mutually offset by the predetermined divisional angles. Thus upon indexing of the clamping jaws one of the sets of actuation surfaces arranged on the actuating member will always come into operative engagement with the associated piston. Since a considerably greater amount of space is available because of the axial juxtaposition than is the case in known swivel chucks, the actuating member can also be turned by very small angles of division.

Preferably the actuation surfaces on the actuating member are formed in axially juxtaposed annular grooves and in a particularly preferred embodiment the actuation surfaces are in the form of rollers disposed in the annular grooves and rotatable about axes parallel to the third axis, two of these rollers always cooperating to form an actuation surface. In this embodiment there is virtually no sliding friction between the piston shoes and the actuation surfaces so that rotation over even the smallest divisional angle becomes practicable. By virtue of the absence of sliding friction the wear on the actuation surfaces and on the corresponding surfaces of the piston shoes is also reduced to a minimum so that the life of the swivel chuck during which the necessary precision is to be maintained is very considerably prolonged.

The rollers of the individual actuation surfaces are suitably arranged at equal angular distances. But it is also at any time possible to select unequal angles since it is merely necessary for the sum of the angular offsets of all actuation surfaces to enable a full revolution of the actuating member. The rollers of one set of actuation surfaces may have identical diameters. But angular differences which normally do not lie in the scope of divisional pivoting can be taken into consideration by differing roller diameters.

In a specially advantageous development of the concept of the invention it is envisaged for the rollers in the actuating member, or for the actuating member with the rollers as a whole, to be exchangeable. Thus it is possible to set partial pivotal movements for the most diverse angles with one and the same swivel chuck, according to the requirements.

According to another aspect of the invention, there is provided a swivel chuck comprising a body adapted to be rotated about a first axis, two bell cranks each pivoted to said body about a second axis perpendicular to said first axis, a jaw carried by a first arm of each bell crank, so as to be rotated about a third axis perpendicular to the first and second axes, means to rotate the jaws about said third axis, the second arm of the bell crank being connected to means acting parallel to the first axis to pivot the bell cranks about said second axis or axes and wherein a link is associated with each bell crank, each link being pivoted to the body and to the associated jaw, the effective length of said link being equal to the distance between the third axis and the second axis of that bell crank, to provide a parallelogram linkage to support said jaw for a constant angular position during pivoting of the bell crank.

The present invention will be more readily understood from the following description of an embodiment, reference being made to the accompanying drawings, in which.

Figure 1:
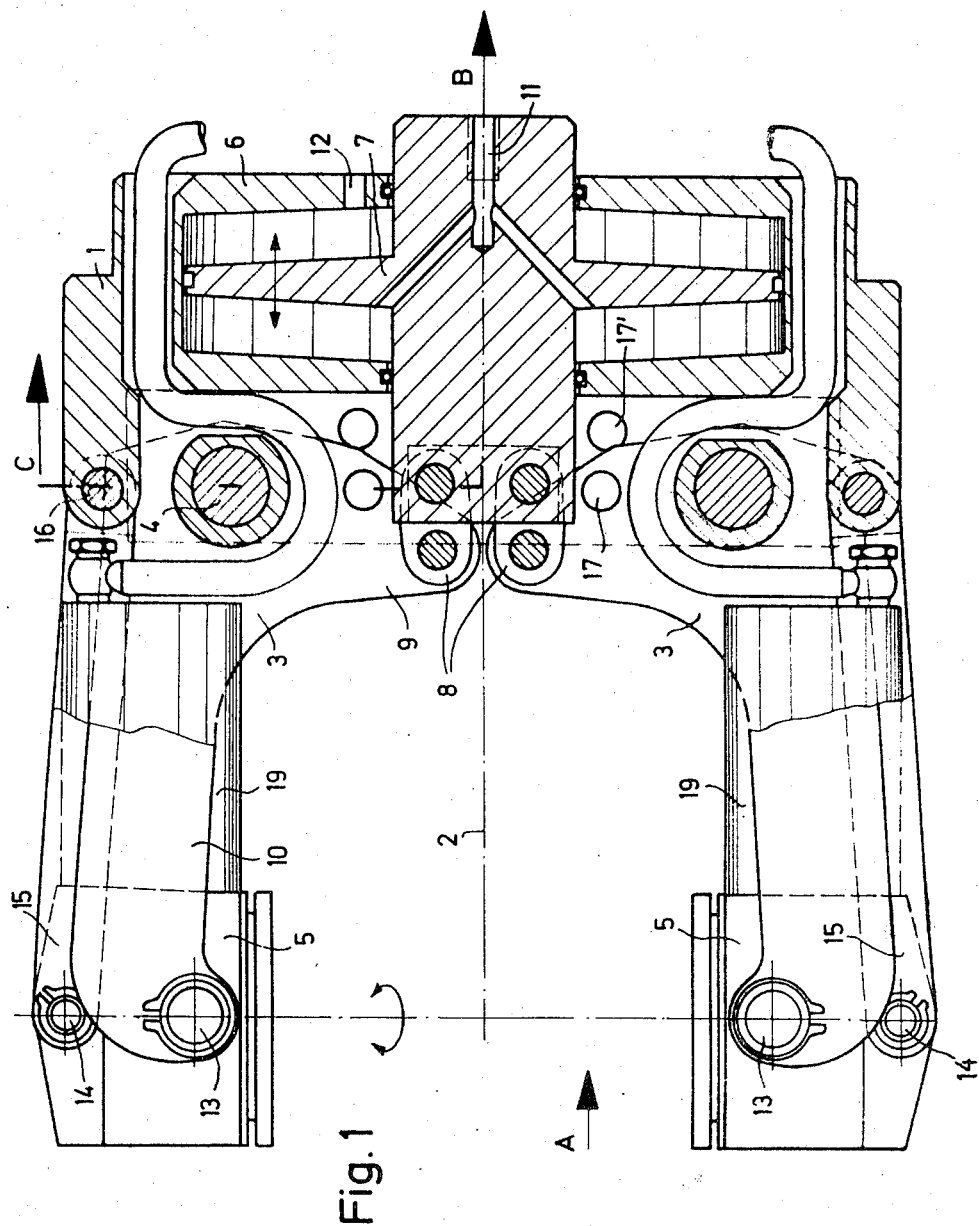
FIG. 1 shows a part-sectional side elevation of one embodiment of swivel chuck according to the invention.
Figure 2:
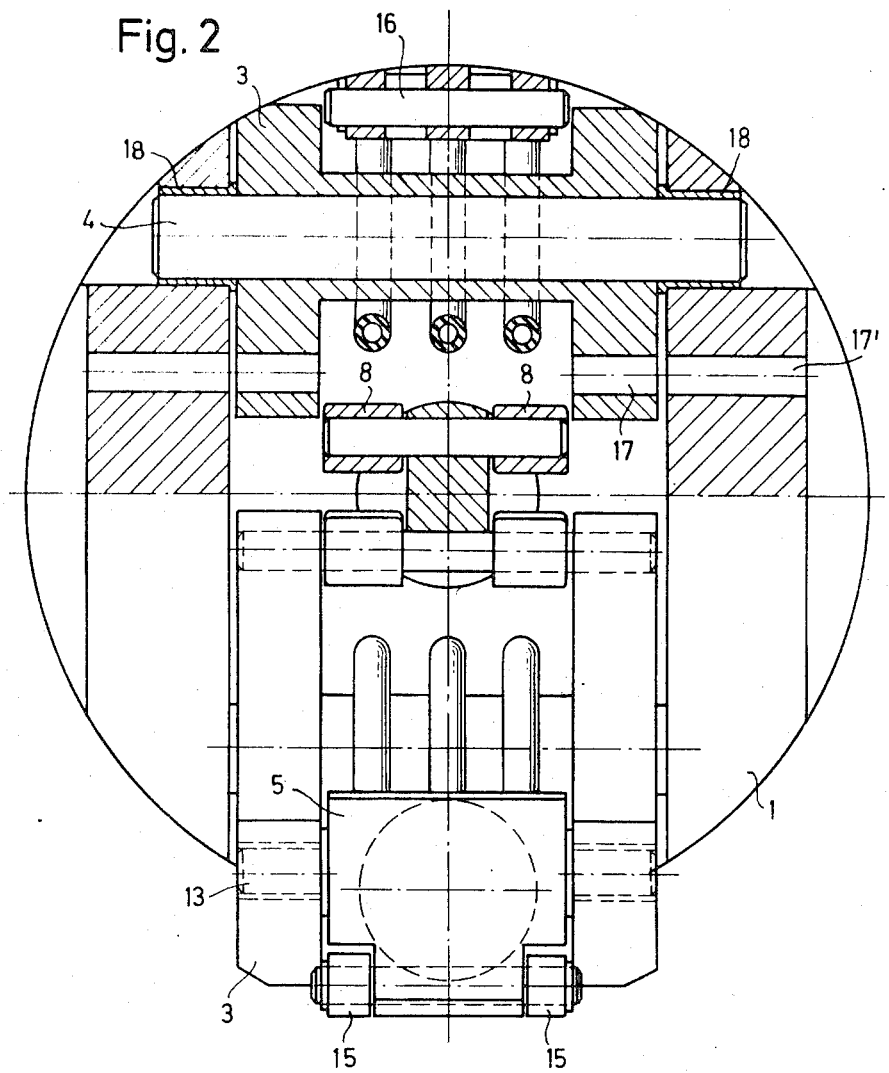
FIG. 2 shows a view in the direction of the arrow A and a section along line B–C of FIG. 1.

As shown in FIG. 1, the swivel chuck comprises a chuck body 1 revolving about a first axis 2 of a turning machine (not shown) bell cranks 3 pivoted to the chuck body 1 and movable in opposite directions about second axes 4 perpendicular to axis 2 and clamping jaws 5 secured to the free ends of the bell cranks 3 so as to be rotatable about a third axis perpendicular to the axis of rotation 2, and to the axes of pivots 4.

A piston 7 pressurized by a pressure medium is reciprocable coaxially of the axis 2 in a cylinder 6 in the chuck body 1. The front end of the piston is connected by guide shackles 8 to those angled lever arms 9 of the bell cranks 3 which point towards the axis 2. The angled lever arms 9 pointing towards the axis of rotation 2 are shorter than the substantially axially extending lever arms 10 of the bell cranks 3, in a ratio of about 1:2. Accordingly, an axial displacement of the piston 7 in the cylinder 6 results in an opening or closing path of twofold transmission ratio for the clamping jaws 5. The piston 7 is adapted to be pressurized by pressure media via bores 11 and 12.

The clamping jaws 5 are mounted via journal pins 13 at the free ends of the longer arms 10 of the bell cranks 3, so as to be pivotable about an axis parallel to the second axes. The jaws 5 are also rotatable, as indicated by the curvilinear arrows, about an axis perpendicular to both the first and second axes. Radially outward of the pins 13 on the clamping jaws 5 there are located further pins parallel thereto, which pins 14 define an axis which, together with the axis defined by the pins 13, lies on a common radius line perpendicular to the axis 2, this line forming the third axis. Parallel links 15 are pivoted to the pins 14, the other ends of the links 15 being connected to the chuck body 1 via journal pins 16 which in turn, together with the axis 4, lie on a common radius line extending perpendicularly to the axis 2. The effective length of the guides 15 thus corresponds to the length of the lever arms 10 of the bell cranks 3. In this way a parallelogram linkage is produced which ensures that the clamping jaws are always guided exactly normal to the axis of rotation 2 when an opening or closing movement of the bell cranks 3 takes place.

Locking bores 17 and 17' are provided in the chuck body 1 and on the bell cranks 3 respectively. For the purpose of locking one of the bell cranks 3 the pin connecting the guide shackles 8 and the short lever arms 9 of the bell cranks 3 can be withdrawn and inserted into the bores 17 and 17'. The piston 7 then moves only one bell crank 3 and the associated clamping jaw 5. This enables workpieces which require an eccentric application from one side to be machined.

The bell cranks 3 are formed by twin arms receiving the clamping jaws 5 between them. It is thus possible to lead the links 15 largely within the bell cranks 3. The axis 4 of the bell cranks 3 is formed by a massive pin which is untwistably guided in bearing bushes 18 in the chuck body 1.

A hydraulic control cylinder 19 for operating an actuating member 20 (FIG. 3) is disposed inwardly of each clamping jaw 5 between the twin arms of each bell crank 3. The working and configuration of these actuating members 20 can be seen in FIGS. 3 to 10.

Figure 6:
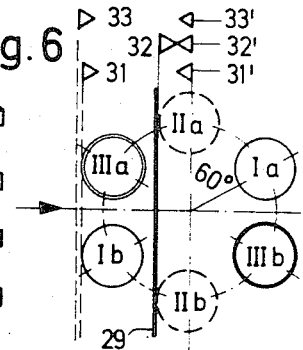
Figure 8:
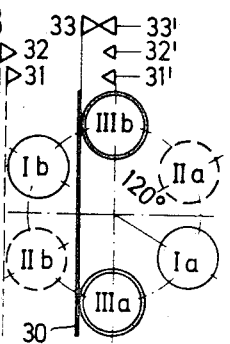

In essence the actuating members 20 comprise a pin 21 connected to a jaw 5 (not shown in FIG. 3) and carrying four equally spaced flanges. The flanges are suitably formed by plunge-cutting annular grooves 23. Between any two juxtaposed flanges 22 are supported journal pins of rollers 24. Two rollers 24, mutually offset by 180°, are arranged in any groove between any two adjacent flanges. As is shown by FIGS. 4, 6 and 8, the rollers of any axially succeeding set of rollers are angularly offset relative to one another by 60°.

The actuating member 20 rotatably journalled in the jaws 5 is actuated via the rollers 24 by pistons 25, 26 and 27 guided in the cylinder 19. A piston rod 25', 26', 27', respectively is associated with each piston, the piston rods of the rearwardly located pistons 25 and 26 being sealedly led through the pistons located ahead of them. Piston shoes 28, 29 and 30 are so fixed to the free ends of the piston rods that they form a right angle with the longitudinal axis of the actuating member 20.

Contacts 31, 32 and 33 arranged on the piston shoes are diagrammatically indicated in FIGS. 4 to 10. These contacts cooperate with corresponding counter-contacts 31', 32' and 33' in the clamping jaws and serve to give an electric return signal whenever one of the piston shoes is in retaining contact with both of its associated rollers 24.

In FIGS. 3 to 10 the rollers have been labelled with Roman numerals I to III for the purpose of differentiating between the individual indexing steps, and additionally differentiation between the two rollers of each set of rollers has been made by adding the indices a and b.

Figure 3:
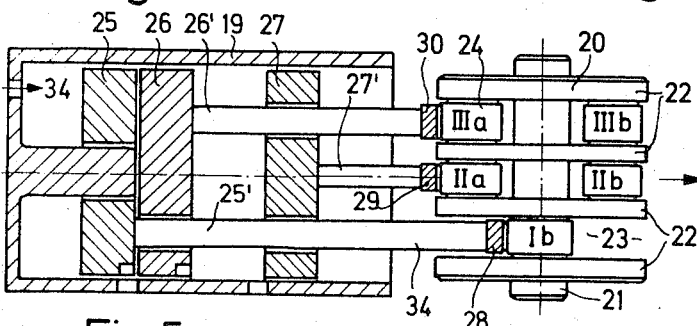
FIGS. 3 to 8 are diagrammatic representations of the switching mechanism used in the swivel chuck of the invention, in various switched positions.
Figure 4:
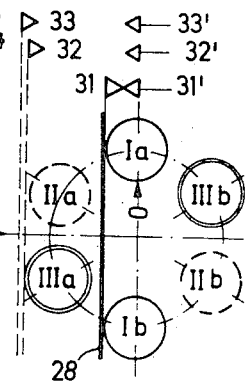

In the position of FIG. 3 the piston 25 is pressurized by introducing pressure medium into the cylinder chamber 34 and urges its piston shoe 28 against the pair of rollers Ia and Ib. This pair of rollers thus necessarily stands at a right angle to the direction of the piston stroke.

Figure 5:
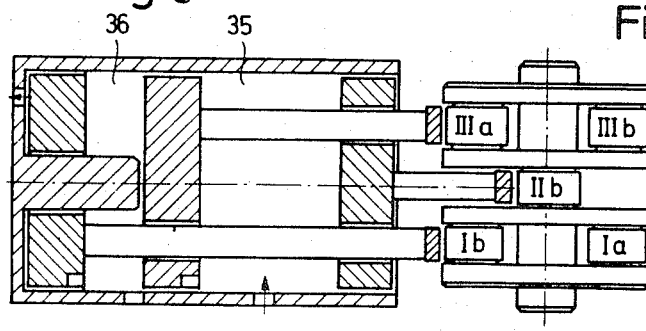

According to FIG. 5 the cylinder chamber 35 associated with piston 27 is pressurized, so that the piston shoe 29 is thrust against both rollers IIa and IIb after the actuating member 20 has been turned by 60°.

Figure 7:
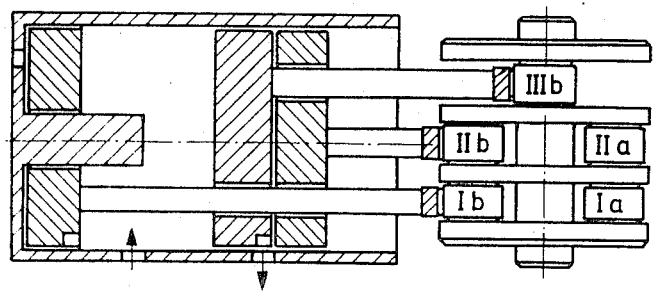

According to FIG. 7 the cylinder chamber 36 associated with piston 26 is pressurized. The piston shoe 30 is thereby thrust against roller IIIa until the piston shoe 30 is in retaining contact with both rollers IIIa and IIIb. Thus a further 60° rotation of the actuating member 20 is achieved.

Figure 9:
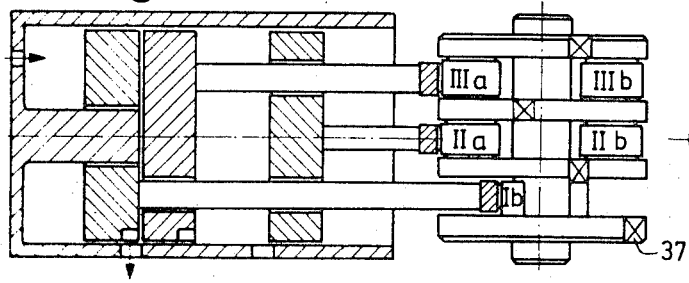
FIGS. 9 and 10 show a representation corresponding to FIGS. 3 to 8, with actuation rollers of different diameters.
Figure 10:
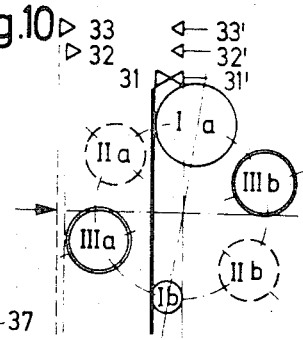

FIGS. 9 and 10 illustrate that an intermediate pivotal position can be set by varying the diameter of roller Ia relative to that of roller Ib.

In the foregoing discussion only two rollers are associated with each piston and each system of actuation surfaces or rollers. But of course three, four, six or more rollers per set of actuation surfaces can be provided and thus any desired divisional or indexing angle can be set. With two rollers per system and three pistons in the cylinder 60° rotation per step results. With three rollers per piston one obtains 40° rotation per step. 30° rotation per step results with four rollers. Additionally, more than three pistons can be provided in the cylinder. When, for example, two rollers are then associated with each piston 45° rotation per step will result.

Due to the above described design of the actuating member the pivot pins of quadrangular or complex special profiles necessary in the known swivel chucks become redundant. The actuating member 20 itself is a pure and simply produceable turned piece. At the same time, the pistons actuating the actuating member are guided in a common cylinder. Thus it is no longer necessary to observe a precise angular association during production. Additionally, any tolerances which may occur and which could lead to lack of accuracy can be compensated for by appropriate choice of roller diameters. Since the actuating member 20 and associated rollers 24 are, as a rule, replaceable as a single unit, any correction once made need not be altered.

The pistons sequentially disposed in the common cylinder each require only one oil supply line. Pressurizing of one piston side necessarily results in the other pistons being led back from the rollers.

When a piston is placed under pressure the piston shoe of that piston forces two of its associated rollers into a position perpendicular to the piston stroke direction. Thus the actuating member is turned into this position if it was not already in this position. For succeeding further rotation of the actuating member with the clamping jaw one of the other pistons is pressurized.

The sequence of pressurizing the pistons is optional and is suitably programme controlled as required. Thus the sense of rotation of the actuating member is also optionally variable. If it is intended to rotate the actuating member by only extremely small angles, e.g., less than 10°, and if it becomes apparent that the thereby applied indexing momentum is too small to overcome a certain resistance, then it is possible to take into consideration in the programme control that a further piston having a greater indexing momentum can be used to assist initiation of the rotary movement, but the indexing is completed by the piston determining the small angle of rotation.

In accordance with the illustration of FIG. 9 the actuating member 20 may at the same time be designed as an actuating drum. To this end grooves 37 may be associated with control switches (not shown). The distribution of the grooves 37 on the circumference of the flanges 22 and their relative angular association on various flanges may be optionally selected. In dependence on the rotational position, at any given time, of the actuating member 20 one or more of the grooves gives an indexing instruction to the turning machine via the associated control switches, whereby the processing associated with the rotational position in question is initiated. In this way it is possible to feed into the machine the "finishing programme" of a workpiece together with the pivot axis cut out for a specific workpiece.

Figure 11:
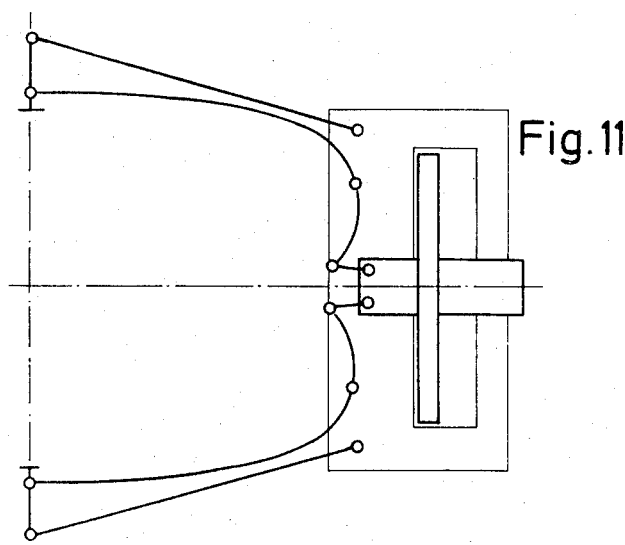
FIGS. 11 to 13 show a diagrammatic illustration of the kinematics of the most essential swivel chuck elements in transition from the opened to the closed position of the clamping jaws.
Figure 12:
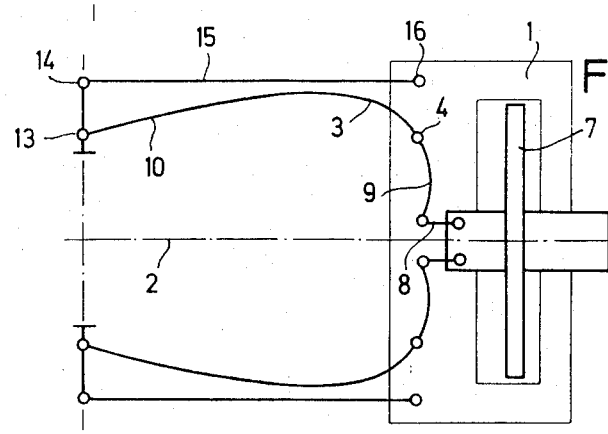
Figure 13:
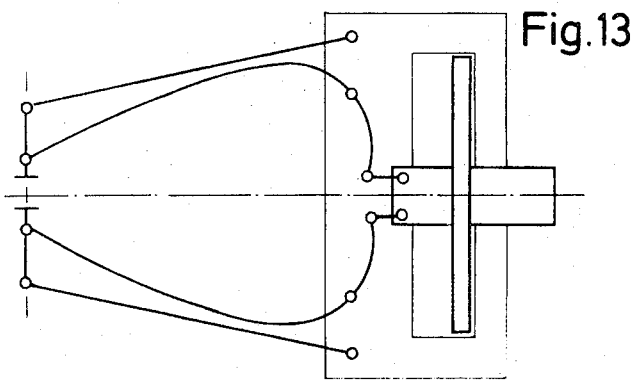

FIGS. 11 to 13 illustrate diagrammatically the course of movements during the opening or closing displacement of the clamping jaws 5. The Figures demonstrate that as a result of the arrangement of the guides 15 the clamping jaws 5 are at all times led exactly perpendicular to the axis of rotation 2.

I claim:
1. A swivel chuck comprising, in combination:-
    a. a body adapted to be rotated about a first axis;
    b. two arms each pivoted to said body about a second axis perpendicular to said first axis;
    c. a jaw carried by each arm at a location spaced from its second axis, each said jaw being rotatable with respect to its associated arm about a third axis perpendicular to the first and second axes;
    d. a cylinder carried by each of said arms;
    e. at least two pistons reciprocable within each of said cylinders;
    f. an actuating member rotatable with each jaw; and
    g. at least two sets of actuation surfaces on each actuating member, angularly offset with respect to one another about said third axis and positioned to be acted upon by said pistons effective to cause rotation of said members and thereby of said jaws.

2. A swivel-chuck as claimed in claim 1, wherein said actuating member comprises annular grooves, spaced along said third axis, and wherein said actuating surfaces each comprises two rollers mounted in one of said grooves so as to be rotatable about axes parallel to said third axis.

3. A swivel chuck as claimed in claim 2, wherein said rollers are exchangeable.

4. A swivel chuck as claimed in claim 2, wherein said actuating members is exchangeable.

5. A swivel chuck as claimed in claim 2, and further comprising means defining a plurality of axial bores associated with each groove, whereby the angular positions of the rollers can be varied.

6. A swivel chuck as claimed in claim 2, wherein said actuating member includes three annular grooves, each groove being provided with two rollers offset by 180° with respect to one another, the rollers of one groove being offset by 60° with respect to the rollers of the other two grooves.

7. A swivel chuck as claimed in claim 2, and further comprising piston shoes associated with each piston and adapted to abut the rollers, and switching contacts on the piston shoes and on the rollers, said contacts being arranged in a control circuit which is thereby closed when a piston shoe abuts both rollers of an annular groove.

8. A swivel chuck comprising, in combination:
    a. a body adapted to be rotated about a first axis;
    b. two bell cranks each pivoted to said body about a second axis perpendicular to said first axis;
    c. a jaw carried by each bell crank at a location spaced from its second axis, each of said jaw being rotatable with respect to its associated bell crank about a third axis perpendicular to the first and second axes;
    d. means for rotating said jaws about said third axis;
    e. a link associated with each bell crank and pivoted to said body and the associated jaw, the effective length of said link being equal to the distance between the third axis and the second axis of that bell crank, effective to provide a parallelogram linkage to support said jaw for a constant angular position during pivoting of the bell crank; and
    f. means acting parallel to said first axis to pivot said bell cranks about said second axes.

9. A swivel chuck as claimed in claim 8, wherein the bell cranks each comprise a first arm pivoted to one of said jaws and a second arm connected to said pivoting means, said second arms being shorter than said first arms.

10. A swivel chuck as claimed in claim 9, wherein said bell cranks each comprise two members spaced apart axially, with respect to said second axes, and wherein said jaws and said rotating means are located between said members.

* * * * *